C. SHORMAN.
SELF PROPELLED MOWING MACHINE.
APPLICATION FILED DEC. 27, 1911.

1,069,736.

Patented Aug. 12, 1913.

7 SHEETS—SHEET 1.

Witnesses:

Inventor:
Chauncey Shorman

By Sheridan, Wilkinson, Scott and Richmond
Att'ys

C. SHORMAN.
SELF PROPELLED MOWING MACHINE.
APPLICATION FILED DEC. 27, 1911.

1,069,736.

Patented Aug. 12, 1913.
7 SHEETS—SHEET 2.

Witnesses:
Inventor:
Chauncey Shorman
By Sheridan, Wilkinson, Scott & Richmond Atty's

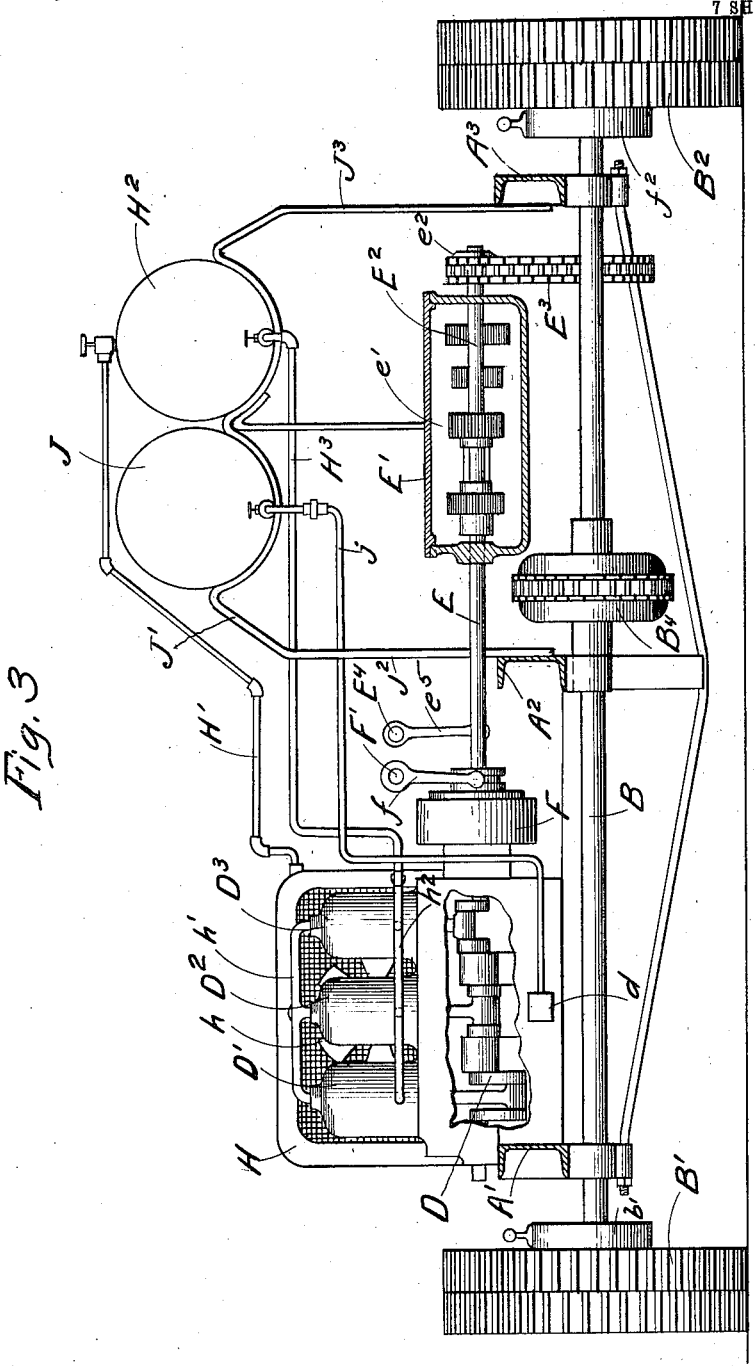

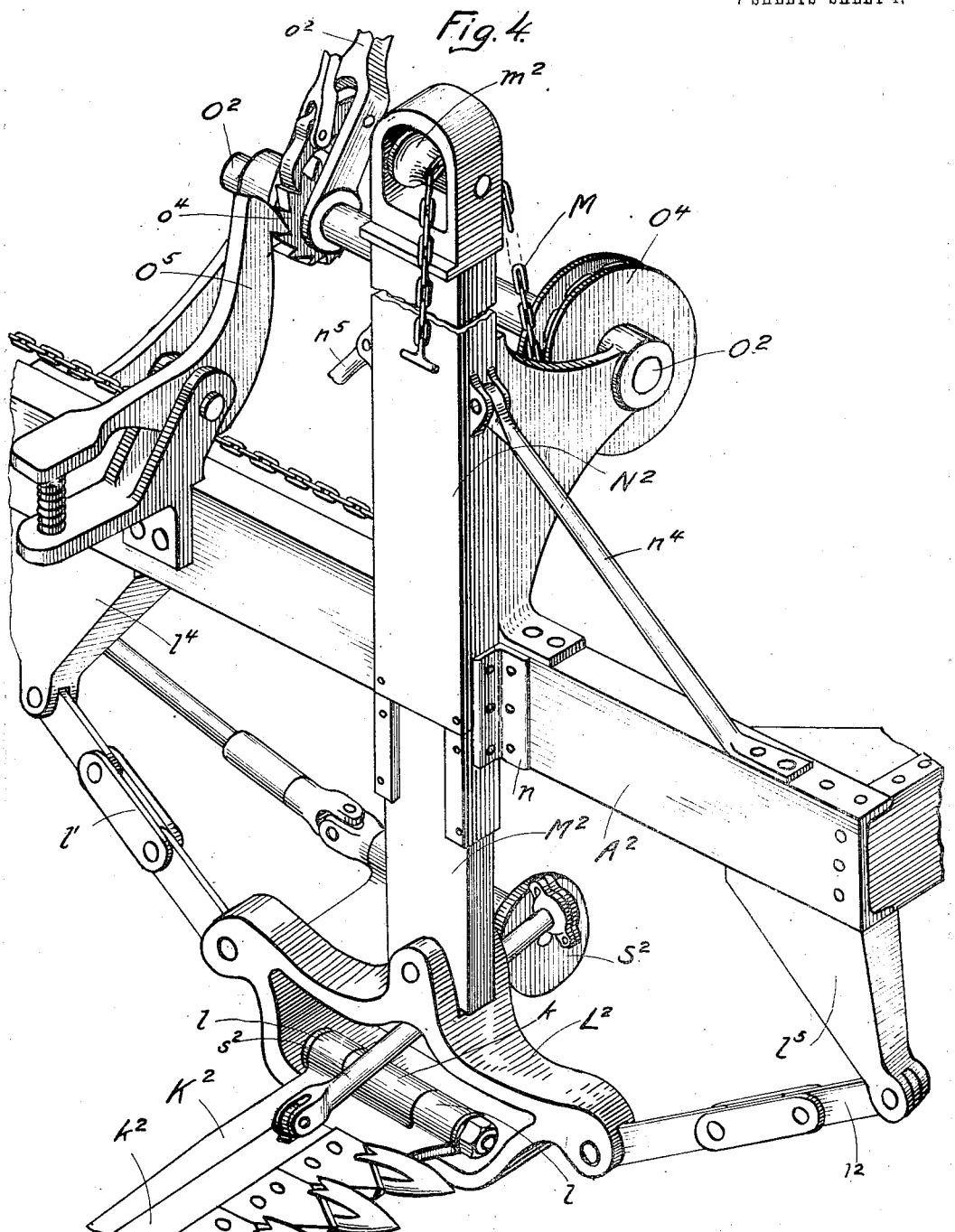

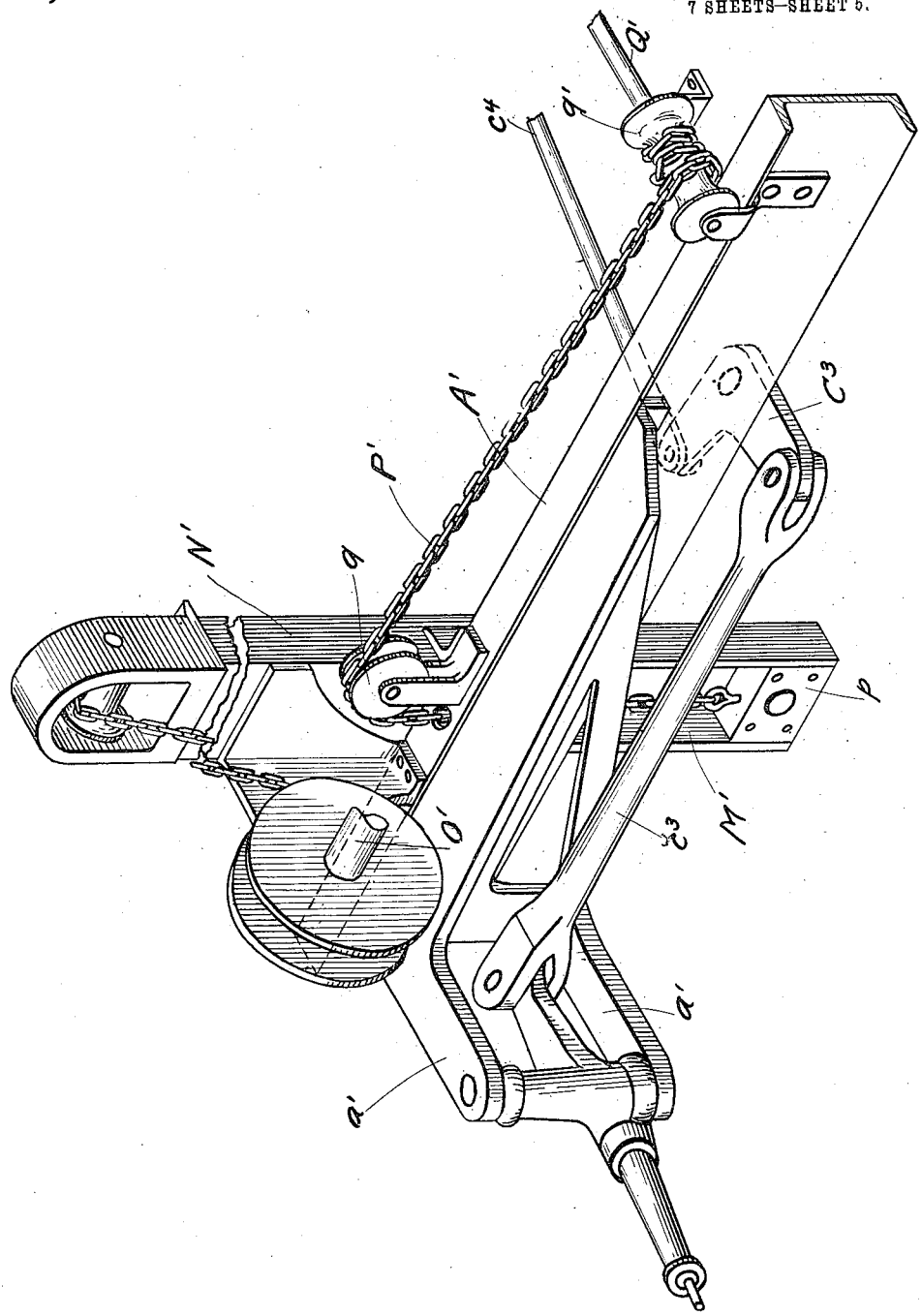

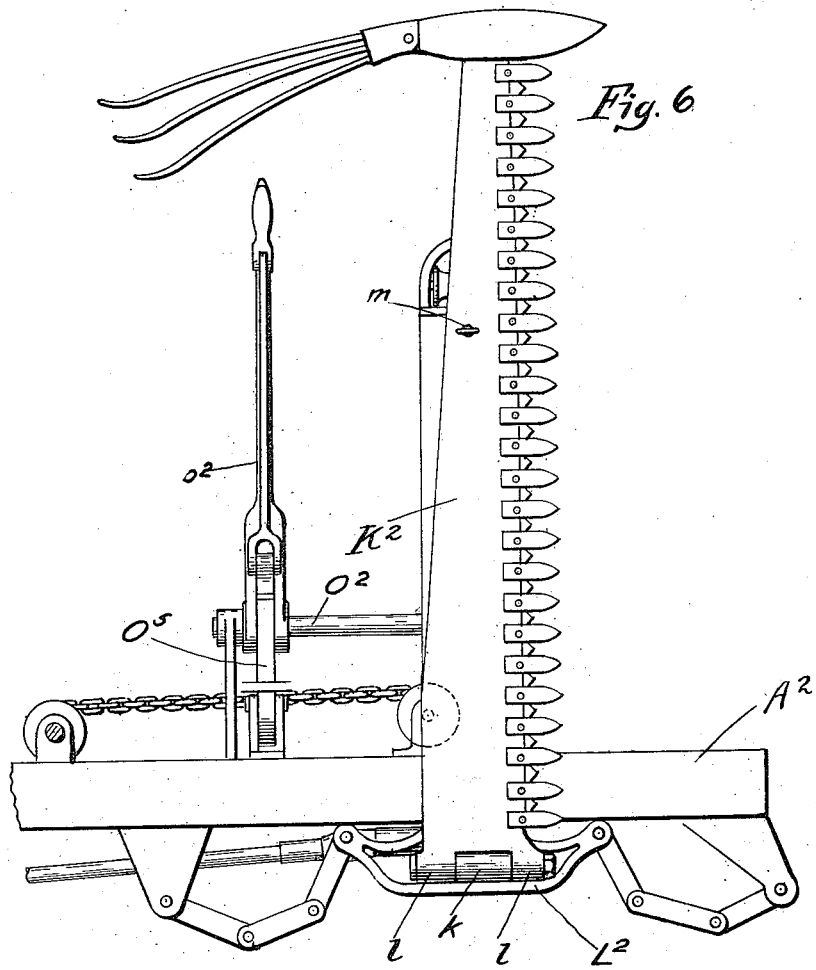
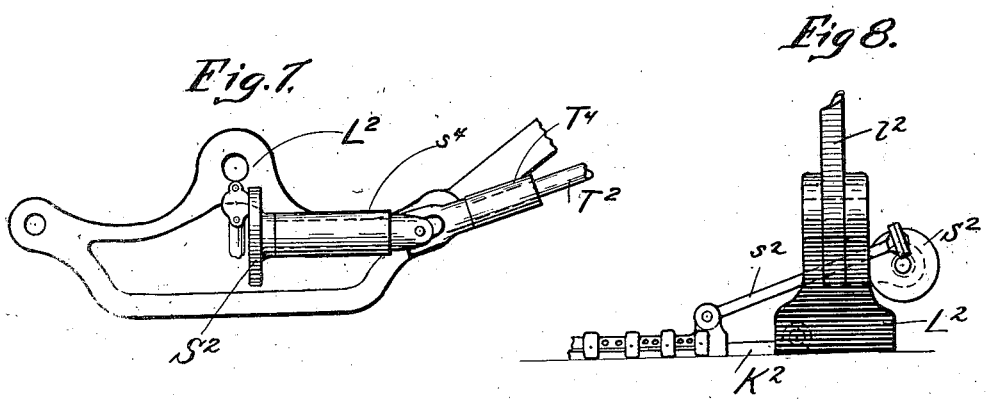

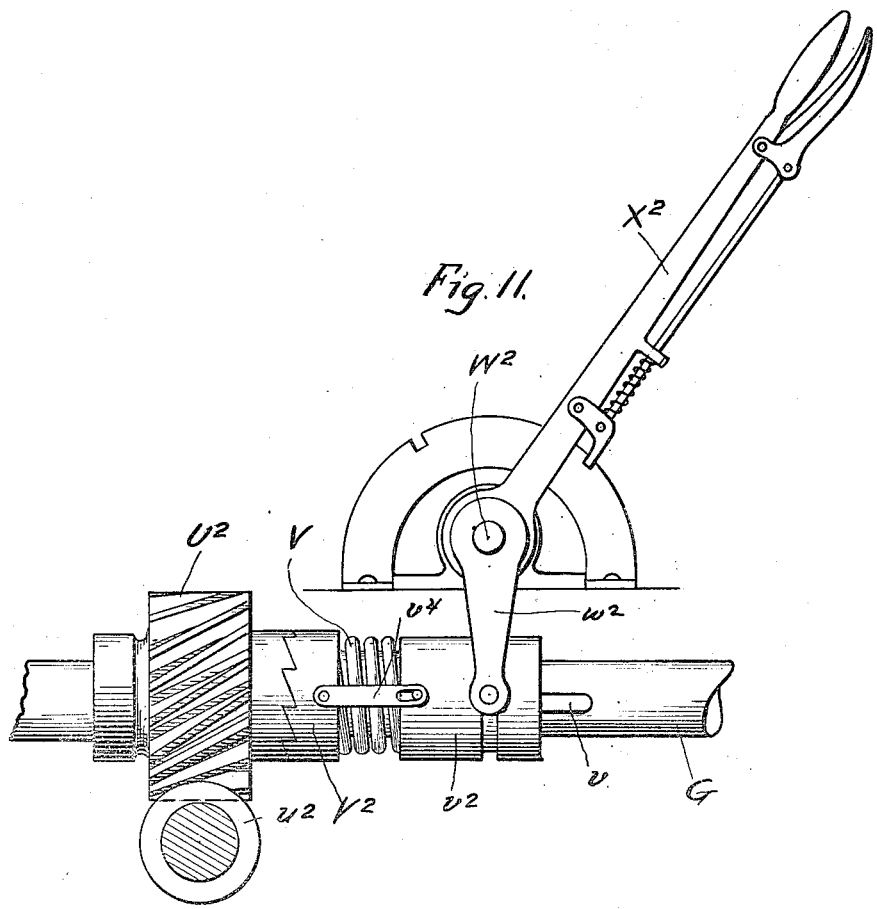
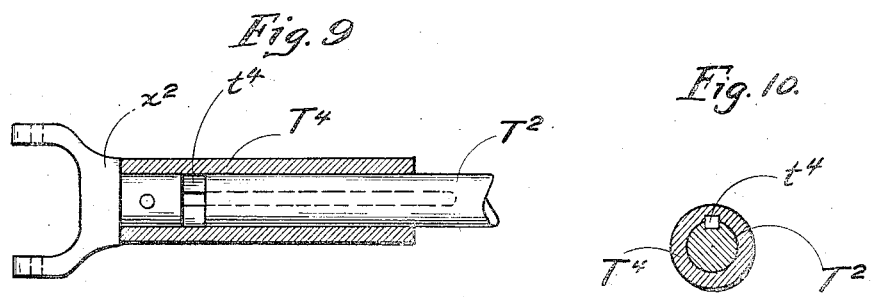
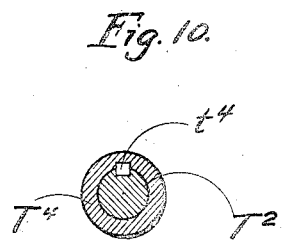

UNITED STATES PATENT OFFICE.

CHAUNCEY SHORMAN, OF CHICAGO, ILLINOIS.

SELF-PROPELLED MOWING-MACHINE.

1,069,736.  Specification of Letters Patent. Patented Aug. 12, 1913.

Application filed December 27, 1911. Serial No. 668,030.

*To all whom it may concern:*

Be it known that I, CHAUNCEY SHORMAN, a citizen of the United States, residing at Chicago, in the county of Cook and State of Illinois, have invented certain new and useful Improvements in Self-Propelled Mowing-Machines, of which the following is a specification.

My invention relates in general to agricultural implements, and more particularly to a self-propelled mowing machine.

The primary object of my invention is to provide a self-propelled mowing machine so constructed as to fully utilize the power of the propelling engine.

A further object of my invention is to provide a self-propelling mowing machine in which the maximum width of the swath which it can cut and the speed will be proportional to the power of the propelling engine, and in which the speed of the mower and the width and position of the swath may be varied to meet the various conditions of use.

A further object of my invention is to provide a self-propelling mowing machine, which will be comparatively simple in construction, efficient in use, and economical in operation.

My invention will be more fully described hereinafter with reference to the accompanying drawings, in which the same is illustrated as embodied in a convenient and practical form, and in which—

Figure 1:
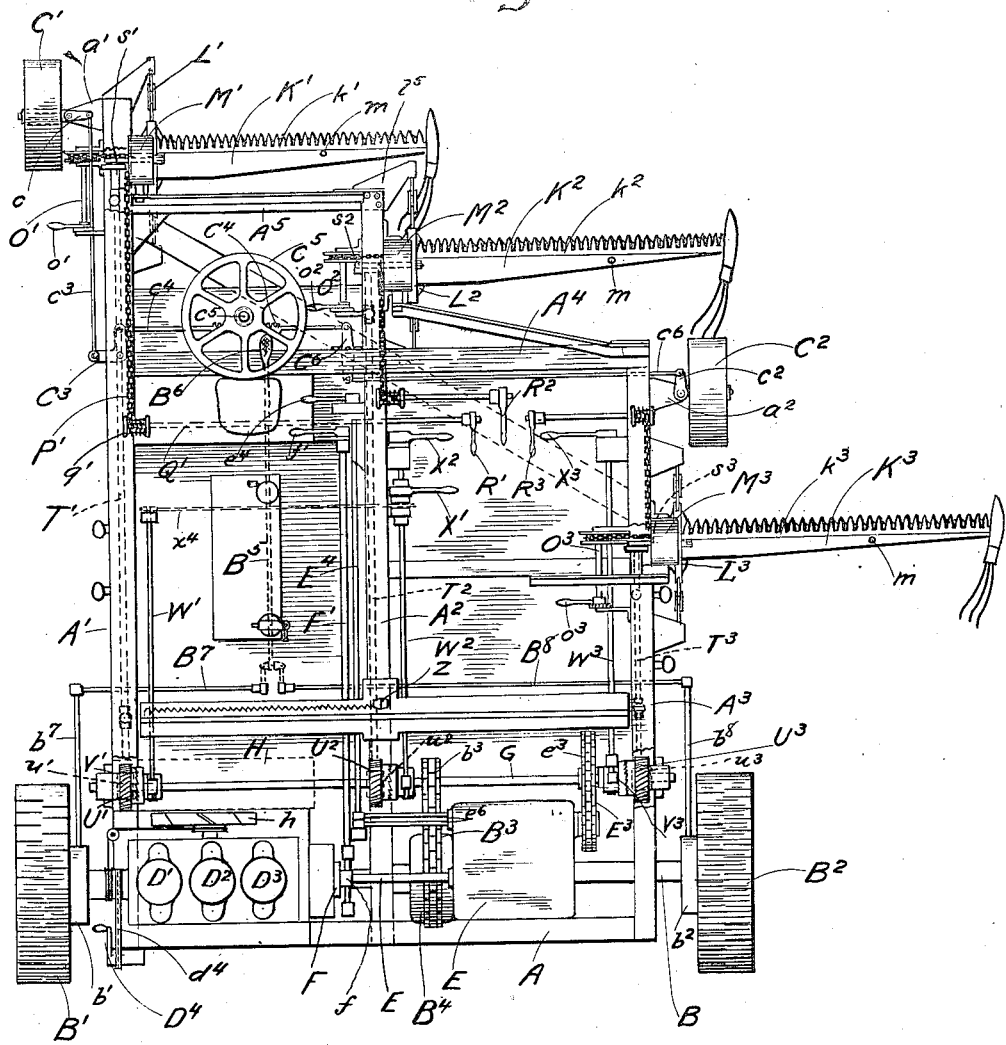
Figure 2:
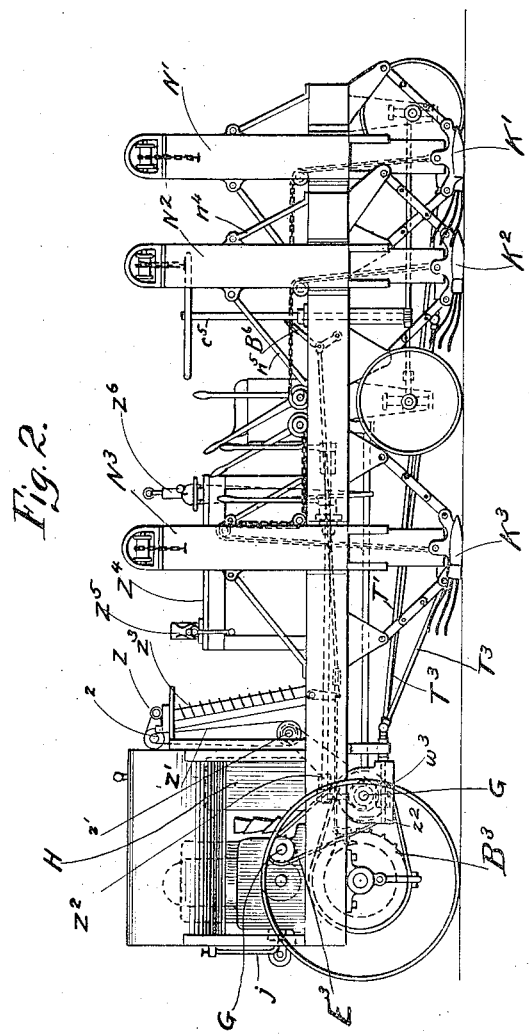

Figure 1 is a plan view; Fig. 2, a side elevational view, looking from the right in Fig. 1; Fig. 3, a vertical section through the plane of the rear axle, showing the engine, transmission and adjacent parts; Fig. 4, an enlarged perspective view, showing the mechanism for adjustably supporting one of the sickle bars; Fig. 5, a perspective view, showing the means for vertically adjusting the height of one of the sickle bars; Fig. 6, an elevational view, showing one of the sickle bars and adjacent portions of the mowing machine, the sickle bar being shown in its vertical inoperative position; Fig. 7, a detail elevational view, showing the inner shoe of one of the sickle bars with a pitman shaft supported thereon; Fig. 8, a detail elevational view, looking from the left in Fig. 7; Fig. 9, a detail view, showing the telescopic portion of the pitman shaft. Fig. 10, a cross sectional view of the telescopic portion of the pitman shaft; and Fig. 11, a detail elevational view of the mechanism for operating one of the clutches on the power shaft for controlling the operation of one of the sickles.

The same reference characters are used to designate the same parts in the several views of the drawings.

The supporting frame upon which the propelling and sickle actuating mechanisms are mounted, and which in turn is supported upon the wheels, comprises a series of longitudinal and transverse members preferably composed of channel bars.

A indicates the rear transverse bar of the supporting frame to which are secured longitudinal members $A'$, $A^2$ and $A^3$.

$A^4$ designates a transverse member of the supporting frame which extends from the front end of the side longitudinal member $A^6$, which is shorter than the longitudinal members $A'$, $A^2$. The member $A^4$ is rigidly secured to the transverse members $A'$, $A^2$ by any suitable fastening means.

$A^5$ indicates the front transverse member of the supporting frame which is rigidly connected at its ends to the forward ends of the longitudinal members $A'$, $A^2$.

*Propelling and steering mechanism.*—B indicates the rear axle to the ends of which are rigidly connected the driving wheels $B'$ and $B^2$, and upon which the rear ends of the longitudinal members of the supporting frame are supported.

$C'$ and $C^2$ designate the front steering wheels of the machine, each of which is mounted upon a pivotally supported knuckle.

$c$ indicates the knuckle which supports the front wheel $C'$ and which is pivotally supported upon a bracket $a'$ secured to the end of the longitudinal member $A'$ of the frame. A rod $c^3$ extends rearwardly from the crank arm of the knuckle $c$ and is pivotally connected to a bell crank lever $C^3$ also pivotally mounted upon the supporting frame. The other arm of the bell crank lever $C^3$ is pivotally connected to a rod $c^4$, the opposite end of which is pivotally connected to one end of a lever $C^5$ pivoted intermediate of its ends upon the transverse member $A^4$. The other end of the lever $C^5$ is pivotally connected to a rod $c^6$ which in turn is pivotally connected with the crank arm of the knuckle $c^2$ upon which the other front steering wheel $C^2$ is mounted. The knuckle $c^2$ is pivotally supported in a bracket A², which is rigidly secured to the supporting frame. The rod c⁴ is provided with a toothed rack C⁴ which meshes with a pinion on the lower end of the steering staff c⁵.

C⁵ designates the steering wheel which is secured to the upper end of the steering staff.

D', D² and D³ designate the cylinders of the engine which are mounted vertically by any suitable means upon the supporting frame and above the rear axle.

D indicates the crank shaft with which are operatively connected the piston rods of the several engines.

E designates a transmission shaft alining with the crank shaft D and extending into the casing E' of the transmission mechanism.

F designates a clutch of any suitable type for rigidly connecting the adjacent ends of the crank shaft D and transmission shaft E.

f designates a crank arm for operating the clutch F and which is rigidly secured to a rock shaft F' extending forwardly of the machine to a point adjacent the driver where it is provided with a crank lever f' by which the shaft F' may be oscillated and the clutch operated to lock or unlock the connection between the crank shaft and transmission shaft. The end of the transmission shaft E within the casing E' is connected by any suitable speed adjusting gears e' with a shaft E² the end of which projects through the casing E' and upon which is secured a sprocket pinion e². A sprocket chain E³ meshes with the sprocket e² and also with a larger sprocket wheel e³ (see Fig. 1) rigidly fixed upon a power shaft G located parallel with and preferably in a plane below the crank shaft. Fixed upon the power shaft G is a sprocket pinion b³ from which the sprocket chain B³ extends to and around the sprocket wheel of the differential B⁴ on the axle B. Any suitable means may be provided for controlling the transmission mechanism so as to vary the speed of the power shaft G, such controlling mechanism being shown as comprising a rock shaft E⁴ extending forwardly to a point convenient for the driver, where it is provided with a crank lever e⁴. The rear end of the rock shaft E⁴ is provided with a depending crank arm e⁵ connected by rods e⁶ with the transmission mechanism.

The machine is preferably provided with suitable brakes which may conveniently comprise friction bands b', b² surrounding and engaging disks fixed upon the rear axle and adjacent the wheels. The friction bands are operated in the usual manner by forwardly extending rods b⁷ and b⁸, respectively, which are connected to depending cranks on rock shafts B⁷ and B⁸, respectively, the latter extending transversely and rotatably mounted upon the supporting frame. The inner ends of the rock shafts B⁷ and B⁸ respectively, are provided with crank arms connected to an operating rod B⁵ extending forwardly to a point convenient for the driver, where it is connected with a foot-operated lever B⁶. (See Fig. 2.)

H indicates a radiator for cooling the water which circulates through the cylinder jackets.

h indicates a fan driven by any suitable mechanism for cooling the radiator and preferably located between the engine cylinders and adjacent the surface of the radiator, as shown in Figs. 1 and 2.

h' indicates the pipes leading from the tops of the cylinder jackets to the top of the radiator, while h² indicates the conduits leading from the engine jackets adjacent their lower ends to the lower portion of the radiator. A conduit H' leads from the top of the radiator to the top of a water tang H², while a conduit H³ leads from the bottom of the water tank to the bottom of the radiator.

J indicates a tank for containing the gasolene or other hydrocarbon for propelling the engine, a conduit j extending from adjacent the bottom of the tang to the usual carbureter d of the engine. The gasolene and water tanks may be conveniently supported upon a frame J' having vertical standards J² and J³ secured at their lower ends to the longitudinal members A² and A³ of the supporting frame.

*Mechanism for operating the sickles.*— My improved self propelling mowing machine comprises one or more sickles and supporting bars, each of which may be separately controlled, but all of which are actuated from the same power shaft G, which shaft also serves to propel the machine. In the embodiment of my invention herein specifically disclosed, three sickle bars K', K² and K³ are provided upon each of which is mounted a reciprocating sickle k', k², or k³. The sickle bar K' is mounted upon the end of the longitudinal member A' of the supporting member; sickle bar K² is mounted upon the longitudinal member A² of the frame adjacent the end thereof; and the sickle bar K³ is mounted upon the longitudinal member A³ of the supporting frame. The means by which the sickle bars are operatively secured to the frame so as to be swung into operative or inoperative position, and so as to be adjusted when in operative position, according to the character of the ground over which the machine moves, are shown more particularly in Figs. 2, 4 and 6. The inner end of each sickle bar is pivotally secured to an inner shoe L', L², or L³, respectively. Each of the inner shoes is provided with front and rear flexible connections with the overlying member of the supporting member. For instance, in Fig. 4, the shoe L² of the sickle bar K² is connected by means of the jointed links $l'$ and $l^2$ with brackets $l^4$ and $l^5$ secured beneath the longitudinal member A² of the supporting frame. The sickle bar is provided with spaced lugs $l$, $l$ which straddle a lug $k$ upon the lower portion of the shoe L², a bolt extending through registering holes in the alined lugs $l$, $k$ and $l$, thereby pivotally connecting the sickle bar to the shoe so that the bar may be swung from a horizontal operative position into the vertical inoperative position shown in Fig. 6. The top portion of each of the shoes is provided with spaced ears which straddle and are pivotally connected to the lower end of a vertical supporting bar, such as shown at M² in Fig. 4. The vertical bar M² is supported and guided by a vertical hollow guide N² rigidly secured to the adjacent member A² of the supporting frame in any suitable manner, as by means of angle brackets $n$. Stay rods $n^4$ and $n^5$ extend from the upper end of the guide N² in opposite directions to the member of the frame A² so as to rigidly support the guide upon the frame.

In order that each sickle bar may be conveniently swung into a vertical inoperative position a windlass is provided, such as shown in Fig. 4, comprising a chain M, one end of which is adapted to be detachably secured to the corresponding sickle bar at the point $m$. The chain M passes over a guide roller $m^2$ mounted upon the upper end of the bar M² and thence passes to the sheave O⁴ to which it is secured. The sheave is fixed upon a rock shaft O² mounted in suitable brackets upon the supporting frame. The end of the rock shaft O², opposite to that on which the sheave O⁴ is fixed, has fixed thereon a ratchet wheel $o^4$ which is engaged by a pawl carried by a hand lever $o^2$ mounted to oscillate upon the rock shaft O². A foot operated pawl O⁵ engages the teeth of the ratchet wheel $o^4$ to hold the rock shaft O² in any position to which it may be oscillated by the oscillation of the hand lever $o^2$.

When it is desired to elevate any one of the sickle bars into inoperative position, the corresponding chain M is engaged with the sickle bar at the point $m$ and the operator then oscillates the hand lever $o^2$ to rotate the shaft O² and thereby wind the chain M around the sheave O⁴ so as to swing the sickle bar from its operative horizontal position into a vertical position. In order to lower the sickle bar into its horizontal operative position, the foot pawl O⁵ is disengaged from the ratchet wheel $o^4$ and the rock shaft O² permitted to be rotated by the weight of the sickle bar through the manipulation of the hand lever $o^2$ in an obvious manner.

In order to adjust the horizontal height of each sickle bar relatively to the ground so that it may pass over an obstruction or avoid contact with the ground when rough, a separate windlass is provided for raising or lowering the inner shoe of each sickle bar. This mechanism will be readily understood from an inspection of Fig. 5, which illustrates the mechanism for elevating or lowering the sickle bar K'. The lower end of the vertically adjustable bar M' which supports the shoe has a bearing block $p$ rigidly secured therein through which the pivot pin which unites the shoe thereto passes. A chain P' is secured to the block $p$ and extends upwardly through the overlying member A' of the supporting frame, and thence passes around a guide pulley $q$ mounted upon the frame member, and thence passes to a sheave $q'$ to which it is connected, the said sheave being fixed upon a rotary shaft Q' journaled upon the supporting frame. The inner end of the shaft Q' has fixed thereon a suitable hand lever R' for rotating the same. It will be evident that by operating the hand lever R' the shaft Q' will be rotated and the chain P' wound on the sheave $q'$, thereby raising the bar M' and with it the sickle bar K'. The sickle bar may be lowered by a reverse operation.

It will be observed by reference to Fig. 1 that the hand levers R² and R³ for raising and lowering the shoes L² and L³ of the sickle bars K² and K³ are located adjacent the hand lever R', so that the same operator may easily control the elevation of all of the sickle bars.

Each of the sickles is reciprocated upon its sickle bar by mechanism extending back to and operated by the power shaft G. Referring to Figs. 4, 7 and 8, it will be seen that the sickle $k^2$ is connected at its inner end to the pitman rod $s^2$, the opposite end of the pitman rod being pivotally connected to the crank S². A flexible shaft T² is connected with the crank S². The portion of the crank shaft immediately adjacent the crank is supported within a sleeve $s^4$ mounted upon the shoe L². The adjacent section of the pitman shaft T² is made extensible so as to compensate for the different elevations of the shoe in any suitable manner, as, for instance, that shown in Figs. 9 and 10, in which a sleeve T⁴ is rigidly secured to one section of the pitman shaft and surrounds the adjacent section which it non rotatably engages through an interposed key $t^4$. The key permits the section of the pitman shaft which it connects with the sleeve T⁴ to move longitudinally relatively to the sleeve, but at the same time non rotatively connecting such portion of the shaft with the sleeve. The pitman shafts T' and T³ are connected in a similar manner with the corresponding shoes L' and L³ and with the sickles $k'$ and $k^3$. The flexible shafts $T'$, $T^2$ and $T^3$ extend rearwardly from the respective sickle bar shoes to the power shaft G. Worm wheels $U'$, $U^2$ and $U^3$ are loosely mounted upon the power shaft G and mesh respectively with worms $u'$, $u^2$ and $u^3$ fixed upon the rear ends of the flexible shafts $T'$, $T^2$ and $T^3$. A separate clutch is provided for locking each of the worm gears $U'$, $U^2$ and $U^3$ to the power shaft G, one of such clutches being shown in Fig. 11. Each of the clutches comprises two parts $V^2$ and $v^2$ non rotatively secured to the power shaft but so as to slide thereon in any suitable manner, as by means of a key $v$. The two parts of the clutch have a spring V interposed between them and are connected to each other by links $v^4$ having slots in their ends engaging pins on one of the parts of the clutch. The face of the part $v^2$ of the clutch is provided with teeth which engage complemental teeth on the adjacent worm wheel $U^2$.

The part $v^2$ of the clutch is provided with an annular groove engaged by the bifurcated ends of a yoke $w^2$. The yoke is fixed to the rear end of a rock shaft $W^2$ suitably journaled upon the longitudinal member $A^2$ of the supporting frame. The forward end of the rock shaft $W^2$ is provided with a hand lever $X^2$ for oscillating the shaft and thereby reciprocating the clutch upon the power shaft G so as to engage or disengage the part $V^2$ of the clutch with the coöperating teeth on the worm wheel $U^2$. A similar clutch $V^3$ controls the connection of the worm $U^3$ with the power shaft and is operated by rock shaft $W^3$ suitably journaled upon the longitudinal member $A^3$ of the supporting frame and provided at its forward end with a hand lever $X^3$. A similar clutch $V'$ is also provided on the power shaft G for controlling the connection therewith of the worm gear $U'$ which actuates the sickle $k'$. The rock shaft $W'$ is provided for operating the clutch $V'$, the handle $X^3$ being provided for oscillating the shaft $W'$. In order that the hand lever $X'$ may be located at a point adjacent to the hand levers $X^2$ and $X^3$, a sprocket chain $x^4$ connects sprocket pinions on the forward end of the shaft $W'$ and on the hand lever $X'$, as indicated in Fig. 1. The hand levers $X'$ and $X^3$ may be conveniently constructed in the same manner as the hand lever $X^2$ which is specifically shown in detail in Fig. 11.

Inasmuch as the sickles on my improved mowing machine will be driven at much greater speed than is customary with the ordinary horse propelling mowing machines, and inasmuch as my invention will often be used for cutting large tracks of hay, alfalfa, or the like, it may often be desirable to provide means for sharpening extra sickles while the machine is in operation. I, therefore, have provided a sickle grinder Z (see Fig. 2) which may be conveniently operated by means of a sprocket chain $Z'$ connecting a shaft $z$ which directly operates the grinder, with a lower shaft $z'$, the latter shaft being operatively connected by a sprocket chain $Z^2$ and sprocket pinions with the power shaft G. A rack $Z^3$ is shown for supporting extra sickles upon the machine. I also may provide upon the mowing machine a work-bench $Z^4$ supporting a vise $Z^5$ and also a drill press $Z^6$, the latter being actuated by suitable power connections with the power shaft G.

The manner of operating my improved mowing machine is as follows: The engine is started in the usual manner, as by means of a starting crank $D^4$ connected by a sprocket chain $d^4$ with a sprocket wheel on the crank shaft D of the engine. By operating the clutch F through the medium of the hand lever $f'$ the crank shaft may be connected with the shaft E leading to the transmission, so that the power shaft G will be driven and the machine propelled through the connection of the differential on the rear axle with the power shaft. The speed of the machine may be controlled through the transmission mechanism by operating the hand lever $e^4$. The direction of the machine may be readily controlled through the hand wheel $C^5$ in the manner customary in self propelled vehicles and engines. When the machine has been driven to the place where it is to be used, the sickle bars are lowered by manipulating the hand levers $o'$, $o^2$ and $o^3$, thereby unwinding the respective chains M which have been previously secured to the several sickle bars at the points $m$. After the sickle bars have been lowered into horizontal position the chains M are disconnected from the sickle bars. It will be obvious that any one or two of the sickle bars may be lowered into operative position, while the remaining bar, or bars, is retained in vertical inoperative position, according to the existing conditions in the use of the machine.

The horizontal operative positions of the sickle bars may be readily varied according to the conditions of the ground over which they pass by manipulating the hand levers $R'$, $R^2$ and $R^3$. It is, therefore, possible to differently adjust the height from the ground of the sickle bars should occasion require it, or any one sickle bar may be temporarily raised to pass over an obstruction, while the other sickle bars remain in normal operative positions.

By manipulating the hand levers $X'$, $X^2$ and $X^3$, the several clutches $V'$, $V^2$ and $V^3$ are separately operated and the pitman rods thereby operatively connected with the power shaft G. Any one or more of the sickles may be operatively connected with the power shaft independently of the others should the conditions of use be such as to render it desirable to have one or more of the sickles in operation while the others remain inoperative.

It will be observed that the steering wheel $C^5$, the brake lever $B^6$, the lever $e^4$ for controlling the transmission and consequently the speed of the machine, and the lever $f'$ for controlling the clutch between the motor and transmission, are all conveniently located for operation by the driver of the machine. It will be further observed that the levers $R'$, $R^2$ and $R^3$ for controlling the elevation of the several sickle bars, and the levers $X'$, $X^2$ and $X^3$ for controlling the clutches of the several pitman shafts, are all located for convenient operation by a single man. Two men may, therefore, control the entire operation of my improved mowing machine, unless it be desired to have a third man sharpen the sickles or make repairs while the other two men are attending to the actual operation of the machine.

From the foregoing description it will be observed that I have invented an improved self propelling mowing machine in which an engine is provided for propelling the machine, and which also serves to operate the sickle or cutting blade through connections with the engine separate from the connections which propel the machine. It will be further observed that my invention renders it possible to employ a plurality of cutting blades each of which is separately operatively connected to a common power shaft, each of which is capable of independent adjustment into operative or inoperative position, and each of which is capable of being independently adjusted as to its height above the ground. It will be further observed that my improved mowing machine is so constructed as to utilize the power, speed, and capacity inherent in an engine of suitable horse power, thereby rendering it possible to cut hay, alfalfa, or the like in greater quantities and in less time, and with less men than has heretofore been possible.

While I have shown my invention as embodied in a machine comprising three independently controlled sickles, yet I do not wish to be understood as limiting myself to any particular number of sickles, as it will be obvious that my invention may be practically embodied in a machine comprising more than three sickles, and may also be practically embodied in a machine comprising merely one sickle or cutting blade, and while I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

What I claim is:

1. In a self-propelled mowing machine, the combination with a supporting frame, of wheels upon which said frame is mounted, an engine supported upon said frame, means for propelling the machine operatively connected to said engine, a plurality of cutting blades, located in substantially the same horizontal plane, means for mounting said blades upon the machine in positions to cut separate swaths, means for separately swinging said blades into substantially vertical positions, and independently controlled means for separately operatively connecting the individual blades with said engine.

2. In a self propelled mowing machine, the combination with a supporting frame, of an engine supported upon said frame, a power shaft driven by said engine, means for propelling the machine operatively connected to said power shaft, a plurality of cutting blades, located in substantially the same horizontal plane, means for mounting said blades upon the machine in positions to cut separate swaths, means for separately swinging said blades into substantially vertical positions, separately controlled means connected with said power shaft for operating each cutting blade and means for controlling the operation of each blade independently of the operation of the other blades.

3. In a self propelled mowing machine, the combination with a supporting frame, of wheels upon which said frame is mounted, an engine supported upon said frame, means for propelling the machine operatively connected to said engine, a plurality of cutting blades, located in substantially the same horizontal plane, means for mounting said blades upon the machine in positions to cut separate swaths, means for separately controlling and operatively connecting said blades with said engine, and means for separately vertically adjusting said cutting blades.

4. In a self propelled mowing machine, the combination with a supporting frame, of an engine supported upon said frame, a power shaft driven by said engine, means for propelling the machine operatively connected to said power shaft, a plurality of cutting blades, located in substantially the same horizontal plane, means for mounting said blades upon the machine in positions to cut separate swaths, separate means connected with said power shaft for operating each cutting blade, means for separately swinging said blades into operative or inoperative positions, and means for separately vertically adjusting said blades.

5. In a self propelled mowing machine, the combination with a supporting frame, of an engine supported upon said frame, a power shaft driven by said engine, means for propelling the machine operatively connected to said power shaft, a plurality of cutting blades, located in substantially the same horizontal plane, means for mounting said blades upon the machine in positions to cut separate swaths, a plurality of rotary pitman shafts, independently controlled means separately connecting the individual pitman shafts with said power shaft, and means separately connecting said pitman shafts with the respective cutting blades for reciprocating the latter.

6. In a self propelled mowing machine, the combination with a supporting frame comprising beams arranged transversely and longitudinally to the line of travel, the longitudinal beams being of different lengths and terminating at their front ends in different transverse planes, of a plurality of sickle bars pivotally supported in substantially the same horizontal plane upon different longitudinal beams adjacent their front ends, whereby said blades occupy positions to cut separate swaths, means for separately swinging said sickle bars into substantially vertical positions, reciprocating sickles supported by said sickle bars, an engine mounted upon said supporting frame, and independently controlled means operatively connecting the individual sickles with said engine.

7. In a mowing machine, the combination with a supporting frame, of a sickle bar, a sickle supported upon said bar, an inner shoe upon which one end of said sickle bar is pivotally supported, means for supporting said inner shoe on said frame, a reciprocating pitman rod connected with the sickle, a rotary pitman shaft, means for rotatably supporting one end of said shaft upon said shoe, and means connecting said shaft and rod for reciprocating the latter.

8. In a mowing machine, the combination with a supporting frame, of a sickle bar, a sickle supported upon said bar, an inner shoe upon which one end of said sickle bar is pivotally supported, a bar on the lower end of which said hoe is supported, means for vertically guiding said bar upon said frame, means for vertically adjusting said bar to vary the height of the sickle bar, and flexible connections extending in opposite directions from said shoe to the supporting frame.

9. In a self propelled mowing machine, the combination with a supporting frame comprising transverse and longitudinal beams, the longitudinal beams being of different lengths and terminating at their front ends in different transverse vertical planes, of a plurality of sickle bars pivotally supported upon different longitudinal beams adjacent their front ends, reciprocating sickles supported by said sickle bars, an engine mounted upon said supporting frame, means operatively connecting said sickles with said engine, a pair of rear driving wheels and a pair of front steering wheels upon which said frame is supported, means for separately securing the front steering wheels adjacent the ends of different longitudinal beams of said frame, and means connected to both of the steering wheels for oscillating them in unison.

10. In a mowing machine, the combination with a supporting frame, of a sickle bar, an inner shoe upon which one end of said sickle bar is pivotally supported, a support for said shoe, means for vertically guiding said shoe support upon the supporting frame, means for vertically adjusting said shoe support to vary the height of the sickle bar, and means for swinging the sickle bar upon said inner shoe into vertical inoperative or into horizontal operative position.

11. In a mowing machine, the combination with a supporting frame, of a sickle bar, an inner shoe upon which one end of said sickle bar is pivotally supported, means for vertically adjustably supporting said shoe upon said supporting frame, a reciprocating sickle mounted upon said sickle bar, a reciprocating pitman rod connected to said sickle, an extensible pitman shaft rotatably supported at one end upon said inner shoe, means connecting said shaft and rod for reciprocating the latter, a power shaft, and meshed gears interposed between said power shaft and said pitman shaft for rotating the latter.

In testimony whereof, I have subscribed my name.

CHAUNCEY SHORMAN.

Witnesses:
 Geo. L. Wilkinson,
 Henry A. Parks.